Dec. 19, 1933.                A. BALLER                1,939,942
                           ELECTRICAL MACHINE
                           Filed Jan. 3, 1931
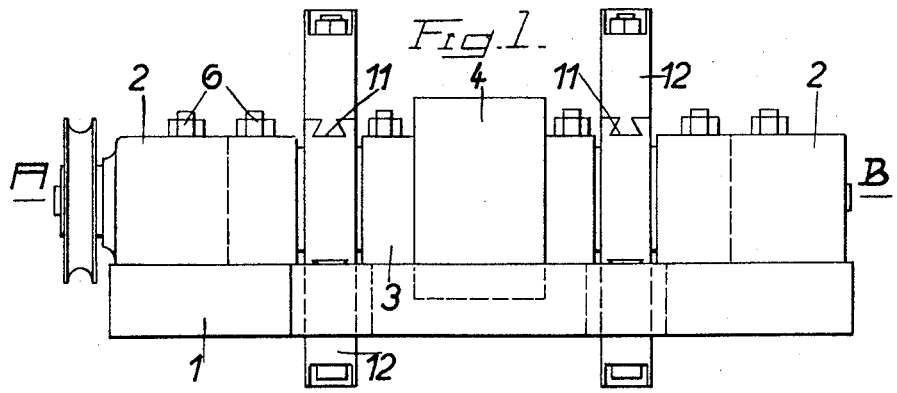
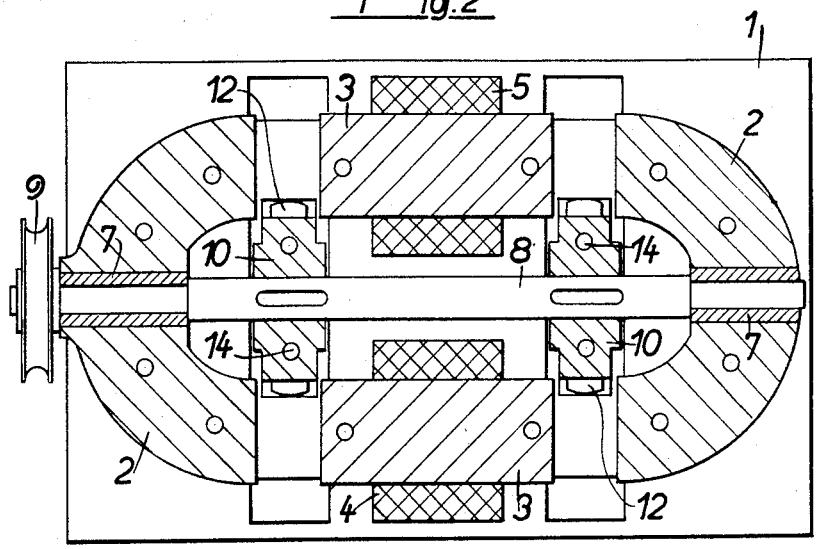
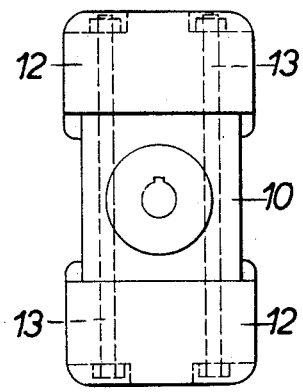
Anton Baller
  INVENTOR:

Patented Dec. 19, 1933

1,939,942

UNITED STATES PATENT OFFICE 1,939,942

ELECTRICAL MACHINE

Anton Baller, Vienna, Austria

Application January 3, 1931, Serial No. 506,370, and in Austria January 7, 1930

7 Claims. (Cl. 171—209)

This invention relates to improvements in induction machines in which flux screens (interruptors) are used to simplify the construction, fully to utilize the screens, to improve the stray or leakage conditions, and to insure ready cooling and accessibility of the coils. The machines are particularly adapted for generating intermediate and low frequency currents.

In high frequency generators such screens usually rotate within a stator inside of which the lines of force form into an annular roll. Since, however, the exciter and armature windings are usually more or less within the space enclosed by the stator, they are subject to heating and are inaccessible during operation. Damage can be detected and repaired only by stopping and taking apart the machine.

Besides, the magnetic stray effects in such machines are extremely unfavorable. The magnetic flux surrounded by the exciter winding can be only partially used for induction because it flows also e. g., in an axial direction over the generator shaft.

The objects of the present invention are attained in the following manner: The magnetic lines of force take usually the shortest path from the north to the south pole of a magnet. By means of screens having edges of magnetic and a hub of non-magnetic material, the lines of force are alternately connected to coils. These coils are in an extension of the magnetic circuit opposite the pole pieces and outside of the shortest line between the latter.

In the drawing in which the invention is exemplified in a horseshoe magnet structure, Fig. 1 is a side elevation, Fig. 2 a horizontal cross-section along lines A—B of Fig. 1, and Fig. 3 is a side elevation of the screen.

1 is a base plate of non-magnetic material. Horseshoe magnets 2 and iron cores 3 of coils 4 and 5 are fastened to base plate 1 by means of bolts 6. Bearings 7 support a shaft 8 provided with a sheave 9. Screens consisting of magnetic end pieces 12 and a non-magnetic intermediate piece 10 are mounted on the shaft 8. The parts 10 and 12 of the screen are dovetailed as indicated at 11 and are firmly held together by means of bolts 13 projecting through perforations 14.

When the shaft 8 is rotated until the magnetic parts 12 of the screens are between the pole pieces and the opposite cores, the wide air gaps will be bridged in pairs. The magnetic circuit is now from the upper or north pole of horseshoe magnet 2 (left-hand side of Fig. 2), the upper screen section 12, iron core 3 of coil 5, a soft iron connection (not shown) to the coil 4, and then over the lower screen section 12 to the south pole of the magnet. The non-magnetic hub 10 of the screen blocks the shortest path of the lines of force, i. e., direct from the N to the S pole.

During continued rotation of the shaft, the screen sections 12 are removed from the air-gap and the flux is interrupted, i. e., disconnected from the longer path over the coils. Since, however, the same coils are always opposite the same pole pieces, a magnetic field will be induced therein which varies only in strength, but not in direction.

If instead of the above described soft iron connection, which is used only in bipolar machines, the arrangement shown in Figs. 1 and 2 is provided, in which a screen and horseshoe magnet are provided on the right-hand side corresponding to the ones described on the left-hand side, then the effect of a 4-pole machine will be obtained.

In this and other similar constructions in which a plurality of screens are used, the right-hand screen may, for instance, be rotated at a different speed than the left-hand screen or it may be rotated in the opposite direction, whereby the flux may be controlled at will.

Instead of using electromagnets or permanent magnets 2, the excitation of the system can be controlled also by means of one of the two coils 4 or 5, whereby the direct current which is fed to coil 4 is taken off coil 5 as a pulsating current.

The efficiency of the machine may be increased also by providing additional coils on the legs of the magnets or between them.

The screen shown in Fig. 3 may also be constructed in the form of a disc of non-magnetic material having separated edges of magnetic material.

It will be obvious to those skilled in the art that numerous other modifications may be effected as to form, the number of magnets, the width of the air-gap, the positioning of the coils, the shape of the screen, without departing from the spirit of the invention defined in the claims.

I claim:

1. In an induction machine of the character described, the combination of a stationary magnet, a coil wound armature spaced longitudinally of and forming a continuation axially of each pole of the magnet, and a rotary flux interrupter disposed transversely of both magnet pole pieces and the armature to alternately cut off the flux, said interrupter being provided with a non-magnetic hub.

2. In an induction machine of the character described, the combination of opposed U-shaped magnets, the latter being arranged to bring the opposite pole pieces in axial spaced relation with each other, a coil wound extension arranged axially in the space between each opposed pair of pole pieces and spaced at its ends from each of said pole pieces, and a rotary interrupter operating in the space at each end of the extension comprising a non-magnetic hub and circumferentially spaced magnetic screens simultaneously and alternately cutting the flux from the pole pieces of said magnets to the extension.

3. In an induction machine of the character described, the combination of a pair of opposed U-shaped members, the latter being arranged to bring the straight portions thereof in axial spaced relation with each other, a coil wound extension disposed axially in the space between the opposed straight portions of said U-shaped members, an electric current supply connected to one extension and means for tapping off current associated with the second extension, further, a rotary flux interrupter disposed in each space between the ends of said extensions and the said straight portions of the U-shaped members, said interrupter comprising a non-magnetic hub and magnetic circumferentially disposed screens, whereby upon rotation of said interrupter and operation of said current supply, the magnetic flux arising in the extension which is transmitted by the electric current into a solenoid, is transmitted to a U-shaped member, when the magnetic screens of the interrupter take a position between the extension and the straight portion of the U-shaped member, whereas the flux is interrupted when the interrupter clears the space between the extension and the straight portion of the U-shaped member.

4. In an induction machine of the character described, a U-shaped magnet, a coil wound extension associated with said magnet to form an extended magnetic circuit, said extension being spaced from the pole pieces of the magnet a substantial amount, and a rotary interrupter of magnetic material having a non-magnetic hub disposed in the said space between the extension and the pole pieces of the magnet, whereby the magnetic flux is transmitted to the extension when the said interrupter takes a position between the pole pieces of the magnet and the said extension whereas the flux is interrupted when the said interrupter clears the space between the pole pieces and the extension.

5. A device, as claimed in claim 2, in which said interrupters are rotated at different speeds.

6. A device, as claimed in claim 2, in which said interrupters are rotated in inverse direction with respect to each other.

7. A device as claimed in claim 3, in which said electric current supply delivers direct current, whereby the current tapped at the extension for the second coil is alternating current.

ANTON BALLER.